(12) United States Patent  
Petersson et al.

(10) Patent No.: US 8,282,375 B2  
(45) Date of Patent: Oct. 9, 2012

(54) METHOD AND DEVICE FOR SHAPING OF COMPOSITE MATERIAL

(75) Inventors: Mikael Petersson, Linköping (SE); Bjorn Weidmann, Borensberg (SE)

(73) Assignee: SAAB AB, Linköping (SE)

( * ) Notice: Subject to any disclaimer, the term of this patent is extended or adjusted under 35 U.S.C. 154(b) by 0 days.

(21) Appl. No.: 13/220,514

(22) Filed: Aug. 29, 2011

(65) Prior Publication Data

US 2012/0003347 A1 Jan. 5, 2012

Related U.S. Application Data

(62) Division of application No. 12/248,351, filed on Oct. 9, 2008, now Pat. No. 8,029,719.

(30) Foreign Application Priority Data

Oct. 9, 2007 (EP) ..................................... 07118136

(51) Int. Cl.  
*B29C 59/02* (2006.01)

(52) U.S. Cl. .......................... 425/112; 425/403; 425/340

(58) Field of Classification Search .................. 425/398, 425/340, 343, 403, 112  
See application file for complete search history.

(56) References Cited

U.S. PATENT DOCUMENTS

| 4,548,859 | A | 10/1985 | Kline et al. |
| 5,114,654 | A | 5/1992 | Hosoi |
| 5,846,464 | A | 12/1998 | Hoffman |
| 2003/0205334 | A1 | 11/2003 | Sherrill et al. |
| 2004/0043196 | A1 | 3/2004 | Willden et al. |
| 2006/0249883 | A1 | 11/2006 | Oguma et al. |

FOREIGN PATENT DOCUMENTS

| EP | 1136236 A1 | 9/2001 |
| EP | 1393875 A1 | 3/2004 |
| EP | 1609584 A1 | 12/2005 |
| EP | 2006312260 A | 11/2006 |

OTHER PUBLICATIONS

European Search Report—Apr. 1, 2008.

*Primary Examiner* — Joseph Del Sole  
*Assistant Examiner* — Kimberly A Stewart  
(74) *Attorney, Agent, or Firm* — Venable LLP; Eric J. Franklin (57) ABSTRACT

A device for shaping of an article of composite material. The device includes a tool including a top surface and side surface for shaping at least one blank of composite material into an article having a predetermined profile; and a air-tight foil. The device further includes at least one support arranged to be in supporting contact with the underside of the protruding part of the blank.

3 Claims, 6 Drawing Sheets

METHOD AND DEVICE FOR SHAPING OF COMPOSITE MATERIAL

CROSS-REFERENCE TO RELATED APPLICATIONS

This application is a divisional application of U.S. patent application Ser. No. 12/248,351 filed 9 Oct. 2008 now U.S. Pat. No. 8,029,719 and claims priority to European patent application 07118136.6 filed 9 Oct. 2007.

FIELD OF THE INVENTION

The present invention relates to a method and a device for shaping of composite materials e.g. thermoforming.

BACKGROUND OF THE INVENTION

Shaping of composite materials, such as pre-preg (layers of fibre material previously impregnated with resin), into details is today commonly performed by thermoforming. In thermoforming, a blank of composite material is placed on a forming tool so that a part of the composite material protrudes over the edge of the tool. The tool and the composite material are covered with a vacuum foil, such as a rubber sheet which is sealed air-tight around the tool. The arrangement is heated and the air under the vacuum foil is sucked out. Due to the increased temperature the composite material softens and is shaped over the forming tool by the force exerted by the vacuum foil exerted on the surface of the protruding part of the blank. The shaped article is thereafter placed in its green state in a curing oven for curing. Examples of related technology are presented in the documents EP1136236 A1, EP1609584 A1 and U.S. Pat. No. 4,548,859 A1.

When using the aforementioned method for shaping of complex composite articles, such as elongated C-shaped beams with longitudinal flanges, a common problem is that the material does not closely follow the contour of the forming tool as the material forms over tool. That is, the radius of the material that is bent over the edge of the tool becomes larger than the radius of the edge of the forming tool, the so called Mickey-mouse effect. This effect is comes due to the fact that the pressure from the vacuum foil is too low at the beginning of the forming process. The problem is even larger for heavy blanks which tend to self form over the tool due to their own weight at the beginning of the forming process.

A further problem is that creases may arise in the articles, due to friction between fibre layers in the blank as the layers slide on each other during forming of the blank. In the case of shaping composite materials which comprise thermo-particles for increased impact strength, the tendency of creasing is even greater since the thermo-particles further increases the friction between the layers.

Previous attempts for solving the above mentioned problems have included manual lay-up and forming over the tool. The use of manual labour for laying-up and forming the material over the tool is time consuming and involves high costs. Another known method for solving the aforementioned problems is to support the composite blank with a release sheet during forming. The disadvantage of this solution is that further forming of the article cannot be done, and that the release-sheet itself can be an incitement for the creation of creases in the composite.

It is an object of the present invention to provide an improved shaping of composite materials into complex forms. This is achieved by a method being defined in the introduction. It is also an object of the present invention to provide a device for shaping a composite article. This is achieved by a device being defined in the introduction.

SUMMARY OF THE INVENTION

The invention relates to a method of shaping an article of composite material, such as a beam for aircraft assemblies or the like. The method comprise the steps of arranging a blank of composite material on the top surface of a forming tool, a portion of the blank being arranged to protrude outside the top surface of the tool and supporting the protruding portion with at least one support means in contact with the underside of the protruding portion of the blank; arranging an air-tight foil over the arrangement; forcing the air-tight foil towards the blank; lowering the support means until the blank is shaped over the tool; stopping and/or removing the support means.

Thereby a blank of composite material can be accurately shaped over a forming tool into an article of predetermined shape. The shape of the resulting article closely corresponds to the form and profile of the tool. The method is fast, simple and cost-effective and requires little manual labour.

The protruding portion of the blank may be supported by several support means successively arranged in a direction outwards from the tool. Whereby the movement of the blank in relation to the tool in a direction outwards from the tool is allowed to be made in smaller steps and the forming against the tool is easier to control. The protruding portion of the blank may be supported by several support means successively arranged alongside the tool. The presence of a plurality of support means allows for forming of complicated shapes, in particular when there are support means arranged both successively in a direction outwards from the tool and support means arranged alongside the tool.

The support means may be lowered in a predetermined order. Thereby is achieved that the shaping is performed in a controlled and efficient manner, thus achieving optimized shaping of the blank over the tool with regard to the contour of the tool and form and properties of the composite blank.

The support means may be lowered in a predetermined order in a direction outwards from the tool, so that the blank very closely follows the contour of the forming tool during shaping and that the bending radius of the composite blank over the edge of the forming tool is minimized.

The support means may also be lowered in a predetermined order alongside the tool. Thereby is achieved that the shaping of the blank can be initiated at a predetermined point alongside the tool. This enables shaping of the blank over a contoured tool. It also enables shaping of a blank with a varying cross-section over the tool. Consequently, blanks can be formed over the tool into articles with complex forms A first support means arranged next to the tool may be lowered when the force from the air-tight foil acting on said support means is higher than a pre-determined value. Whereby, the shaping operation can be controlled to initiate when the forming pressure is high enough to ensure that the blank is shaped closely over the edge of the tool, thus preventing self-forming of the blank; excessive radiuses at the bends; and the forming of creases in the shaped article.

At least one successive support means, arranged adjacent to said first support means may be lowered when the force acting on said successive support means is higher than a pre-defined value and the force acting on the preceding support mean is reduced below a pre-defined value, so that the forming operation proceeds in a controlled manner assuring that the composite blank accurately shapes over the forming tool.

The invention also relates to a device for shaping an article of composite material, such as a beam for aircraft assemblies or the like, the device comprises; a forming tool comprising a top surface and side surface for shaping at least one blank of composite material into an article having a predetermined profile; and an air-tight foil characterized in that the device comprises at least one support means arranged to be in supporting contact with the underside of the protruding part of the blank, thereby a device for shaping articles of composite material is achieved. The device enables accurate shaping of composite blanks over the forming tool into articles having a predetermined shape. The device is fast, reliable and enables automated production of shaped composite articles.

Several support means may be successively arranged in a direction outwards from the tool. Whereby is achieved that the blank very closely follows the contour of the forming tool during shaping and that the bending radius of the composite blank over the edge of the tool is minimized.

Several support means may be arranged alongside the tool. Thereby is achieved that shaping of the blank can be initiated at a predetermined point alongside the tool. This enables shaping of the blank over a contoured tool. It also enables shaping of a blank with a varying cross-section over the tool. Consequently, blanks can be formed over the tool into articles with complex forms Each support means may comprise raising/lowering means and is preferably arranged on an arm, thus forming a supporting arrangement so that a flexible controlled movement of the support, enabling the support means to be raised and/or lowered in a predetermined order is obtained.

DETAILED DESCRIPTION OF THE PREFERRED EMBODIMENTS

Figure 1:
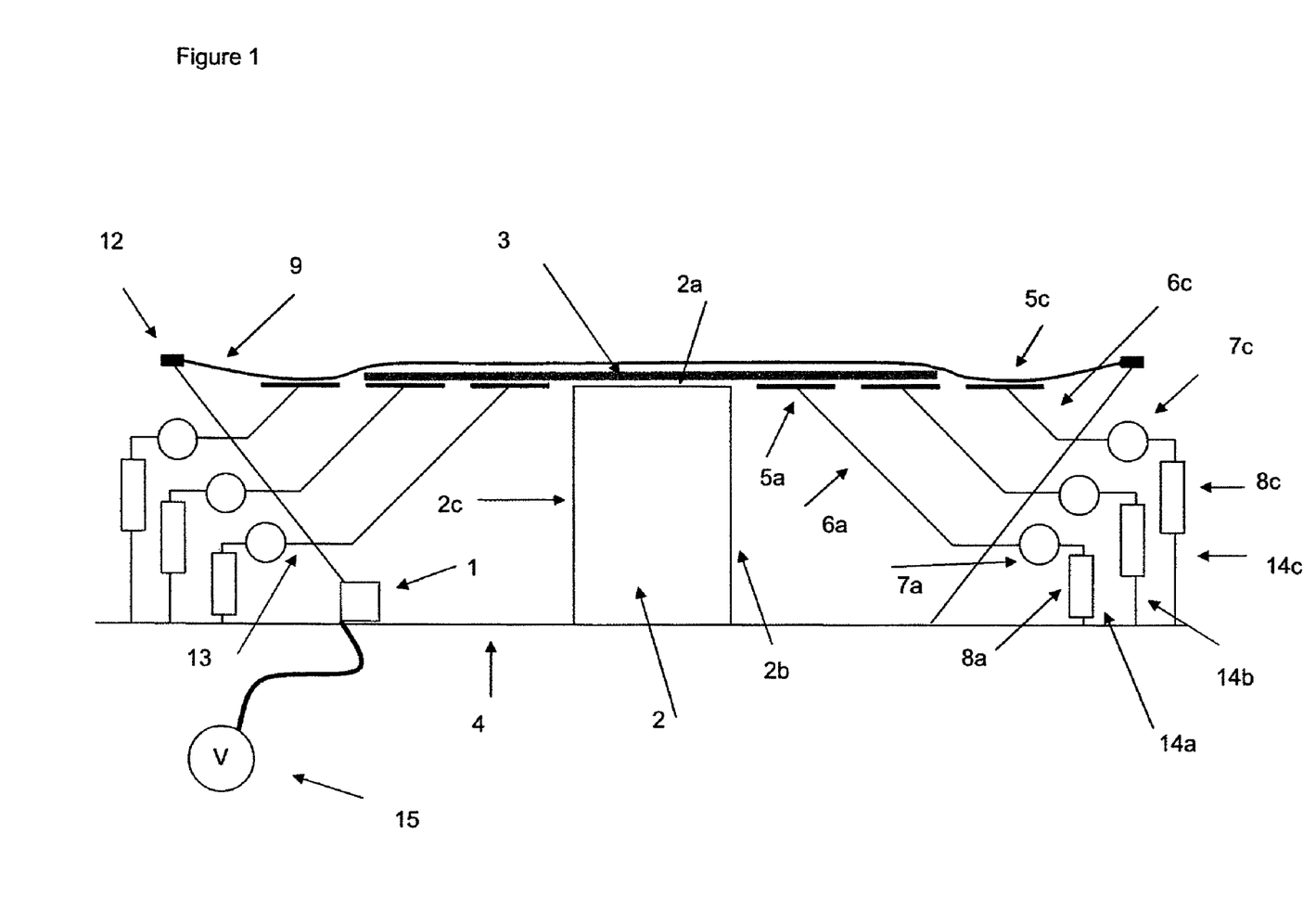
FIG. 1 schematically illustrates the device for shaping a composite article from a side view.

FIG. 1 illustrates a device 1 for shaping a blank 3 of composite material over a tool 2 including a an air-tight foil 9, preferably the shaping is performed by heating the blank to its softening temperature and applying pressure on the blank to force it to form over the tool 2, so called thermoforming.

The device 1 according to the invention for shaping an article of composite material comprises a container 21 including a base 4, which is surrounded by an inclined wall 13. The base 4 supports a heatable forming tool 2 having a top surface 2a and side surfaces 2a and 2c. The tool extends in the longitudinal direction of the container 21. The device 1 further includes one or more support arrangements 14a-n each comprising a flat elongated support means 5a-n and an arm 6a-n. The support means 5a-n are arranged on the arms 6a-n. The support arrangements 14a-n further comprises raising/lowering means 8a-n arranged on one end of the arms 6a-n. The raising/lowering means 8a-n could be hydraulic or pneumatic cylinders, or springs. Each of the arms can further be arranged to pivot around a pivot axis 7a-n. The device further comprises an air-tight foil 9.

With the expression "composite material" is here intended a reinforcing material impregnated with a matrix material. The reinforcing material could for example be fibre, such as carbon fibre, glass fibre, aramide fibre or combinations thereof. The matrix material could be any plastic resin, for example a thermosetting plastic resin, such as epoxy.

With the expression "air-tight foil" is here intended an air-tight, flexible foil which is strong enough to form the blank over the tool by the force of an over- or under-pressure acting on the foil. For example, the air-tight foil could be a vacuum foil, such is as a rubber foil, or a rubber sheet.

FIG. 1 illustrates an arrangement with three support arrangements 14a-n arranged on each side of the tool 2, it is however possible to arrange any number of support arrangements 14a-n in the device 1. It is also possible to arrange an equal or different number of support arrangements 14a-n on each side of the tool 2. Thereby is achieved that e.g. a C-shaped beam can be formed.

Figure 2:
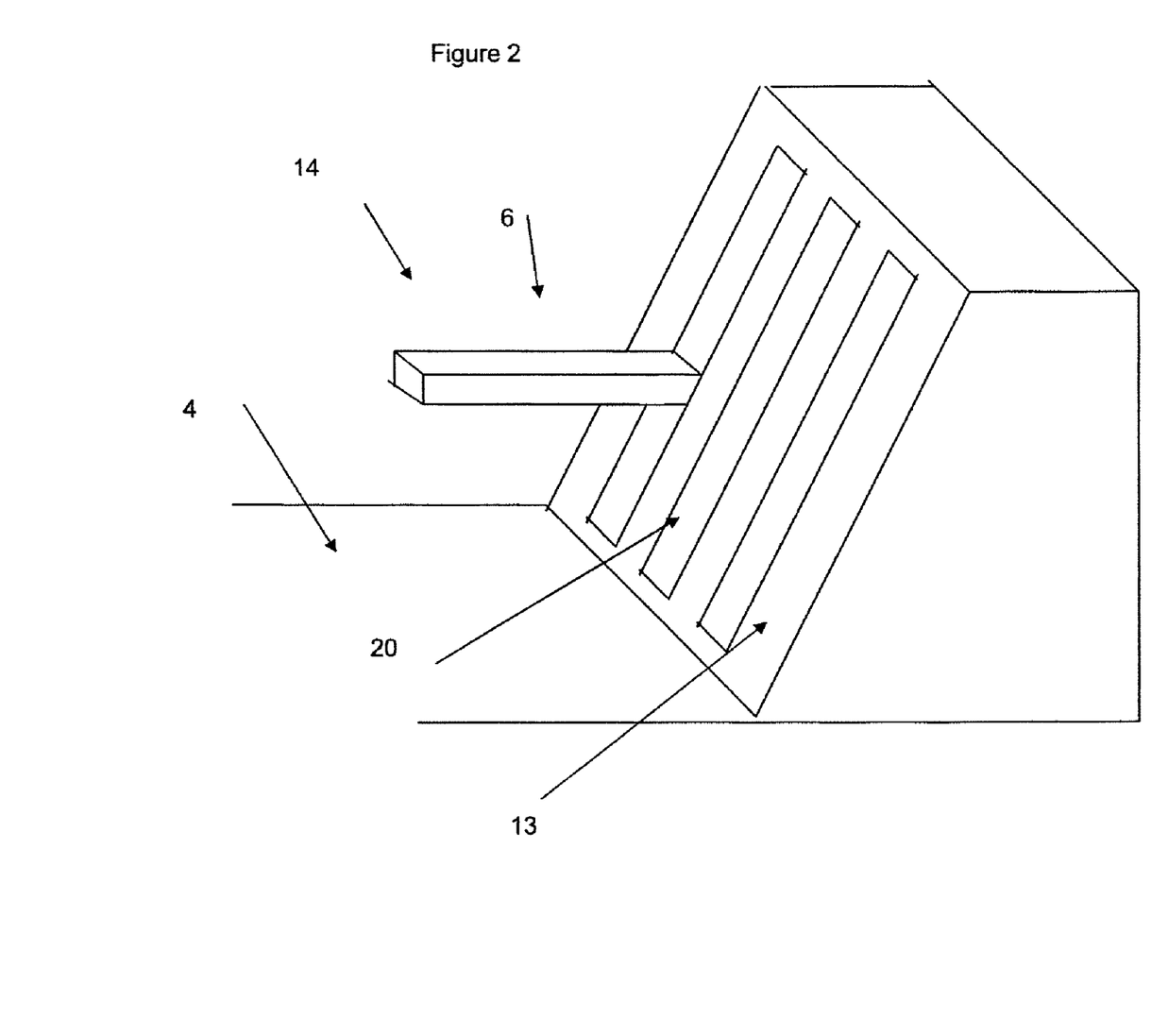
FIG. 2 schematically illustrates a part of the device for shaping a composite article from a side view FIG. 3a-3c schematically illustrates alternatives of the device for shaping a composite article from a top view.

As described in FIG. 2, the support arrangements 14a-n are arranged so that the arms 6a-n protrude from the inclined wall 13 towards the sides of the tool 2b and 2c. The arms 6a-n protrudes through slots 20 in the inclined wall, extending from the base 4 towards the top of the wall 13. As described in FIG. 1, the pivot axes 7a-n and the raising/lowering means 8a-n are arranged on the other side of the inclined wall 13, outside the container. Thus, the side facing away from the tool 2. Thereby the movable parts of the supporting arrangements 14a-n are protected by the inclined wall 13, so that the air-tight foil does not obstruct the movement of the movable parts The air-tight foil 9, for example a rubber sheet, is arranged to be connected air-tight to the top of the surrounding inclined wall 13 by a seal 12. A vacuum port 10 allows air to be drawn from the device 1 by a vacuum pump 15. The device 1 further comprises pressure- or load sensors (not shown). The sensors could be arranged in the supporting arrangements 14a-n for measuring the force from the blank acting on each of the supporting arrangements 14a-n. A remote control unit (not shown) is connected to the support arrangements 14a-n. The remote control unit receives signals from the sensors and controls the actuation of the raising/lowering means 8a-n. The movement of the support arrangements 14a-n can thus be individually controlled by the control circuit.

The support arrangements 14a-n may instead be arranged to be lowered by mechanical means e.g. springs which are dimensioned to linear compress due to the force exerted from the vacuum foil.

Figure 3A:
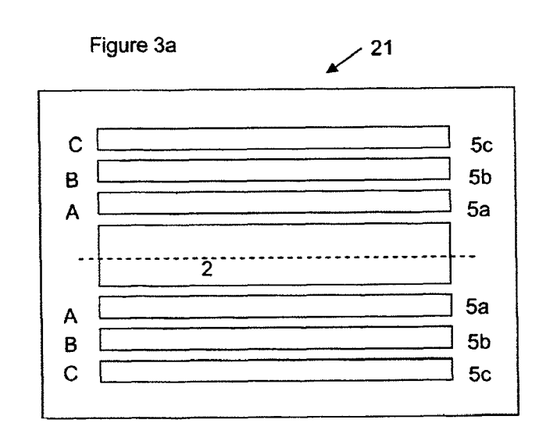

Each of the support arrangements 14a-n may comprise a flat elongated support means 5a-n with a length which substantially is equal to the length of the tool 2. Each of the support arrangements 14a-n is arranged so that the support means 5a-n is parallel to a longitudinal axis through the centre of the tool 2. Several support arrangements 14a-n are arranged successively, parallel to each other in a direction substantially outwards from the tool, thus forming several lines A, B, C, etc, FIG. 3a.

Figure 3B:
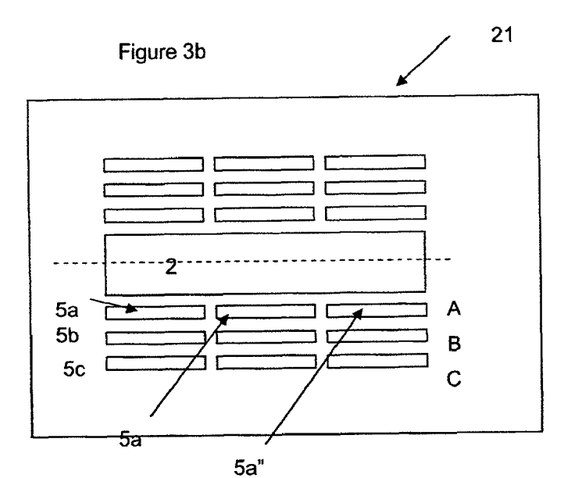
Figure 3C:
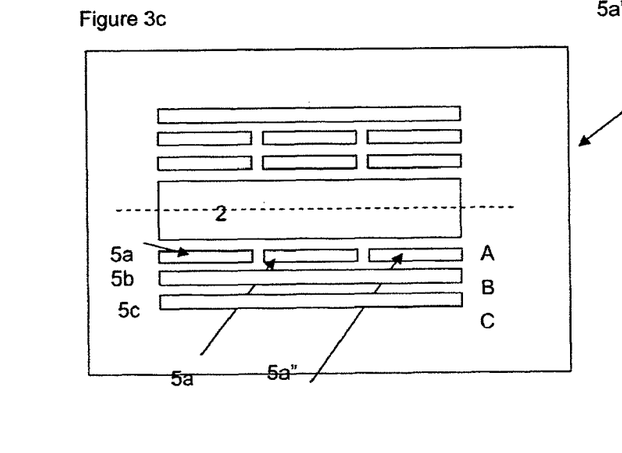

Alternatively, each of the support arrangements 14 a-n may comprise a flat elongated support means 5a-n with a length which is substantially shorter than the length of the tool 2. Several support arrangements 14a-n are arranged alongside the tool 2 so that the flat elongated support means 5a-n are arranged next to each other in a direction alongside the tool 2, thus forming a first line A, approximately having the same length as the tool (2). Further support arrangements 14a-n are successively arranged, thus forming successive lines B, C, etc in a direction outwards from the tool 2, FIG. 3b, Alternatively, several lines A, B, C, D, etc may successively be arranged parallel to the tool 2 in a direction outwards from the tool 2. Each line comprises either one support arrangement 14 a-n, comprising a flat elongated support means 5a-n with a length substantially equal to the length of the tool, or several support arrangements 14 a-n comprising support means 5a-n with lengths substantially shorter than the length of the tool 2, FIG. 3c.

Figure 4:
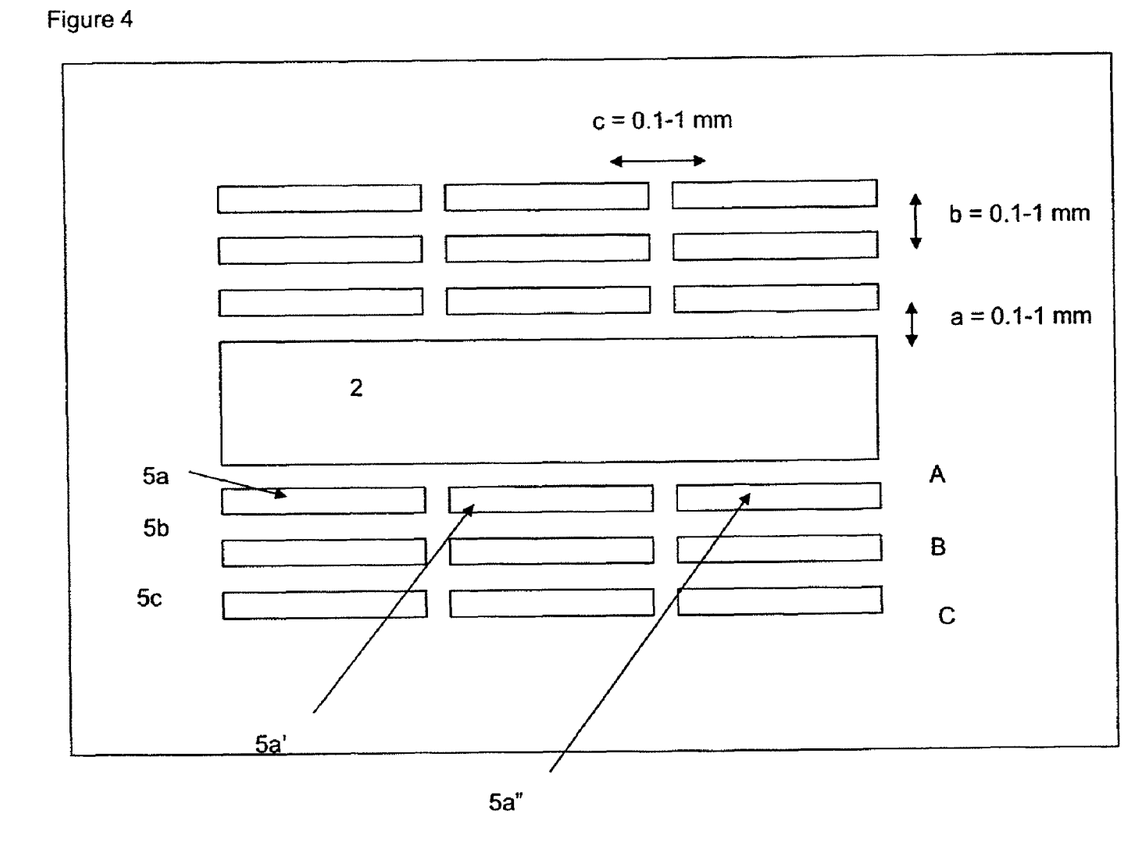
FIG. 4 schematically illustrate a part of the device of shaping of a composite blank is according to the invention.

As described in FIG. 4, the flat elongated members are arranged in a spaced relationship to each other and to the edge of the forming tool 2. The distance (a) between the edge of the tool 2 and the first support means 5a can be between 0.1-1 mm. The distance (b) between two successive support means 5a-n can be between 0.1-1 mm. The distance (c) between two support means 5a-n arranged next to each other can be between 0.1-1 mm. The distance between the support means (5a-n) ensures that the support means 5a-n form an even surface capable of supporting the composite blank 3. The narrow distance between the members (5a-n) ensures that the composite blank 3 does not deform prior to shaping over the tool 2.

Figure 5A:
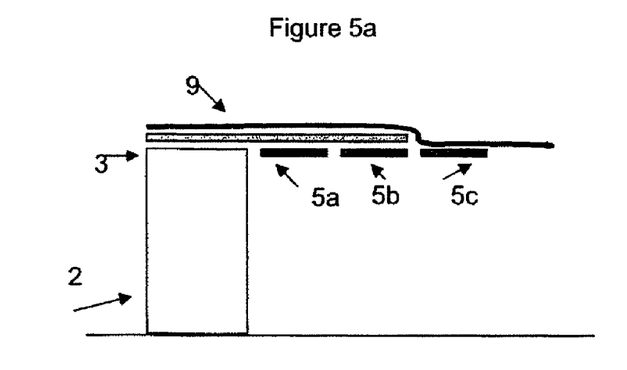
FIGS. 5a-5d schematically illustrate the method of shaping a composite blank according to the invention.

FIG. 5a illustrates the method of shaping a composite material according to the invention. A blank 3 of composite material is arranged on the top surface of the forming tool 2 in a manner so that a portion of the blank 3 protrudes from at least one of the edges 2b, 2c of the tool 2. The support arrangements 14a-n are arranged so that the elongated flat support means 5a-n are level with the surface of the tool 2 and in supporting contact with the underside of the protruding part of the blank 3, i.e. the side of the blank 3 which is facing the surface of the tool 2a. The elongated flat support means 5a-n prevent the blank from moving downwards towards the base 4 of the device 1. The distance between the first support means 5a and the edge of the tool 2, and the distance between the successive support means 5a-n is so short that the blank 3 cannot self form. One of the supporting support means 5a-n is arranged outside the blank 3, supporting the air-tight foil 9

An air-tight foil 9 is arranged over the top of the device 1 and sealed air-tight with a vacuum seal 12 to the top of the device 1. A vacuum pump 15 is connected to the vacuum port 10. The device 1 is heated to a temperature by which the composite material softens. The temperature could be in the range of 40-100° C. The vacuum pump 15 is started. The vacuum pump 15 draws vacuum underneath the air-tight foil 9, thus creating an under-pressure under the air-tight foil 9, the under-pressure could be down to −100 kPa. The under-pressure forces the air-tight foil 9 down, thus forcing the blank 3 towards the surface of tool 2 and also forces the protruding portion of the blank 3 towards the supporting arrangements 14a-n. Thus, the force on the blank is proportionate to the under-pressure.

As the air-tight foil 9 forces the blank 3 downwards, the blank exerts a force on the support means 5a-n. For each support means 5a-n a predetermined value of the force exerted is set, at which the support means is lowered.

Figure 5B:
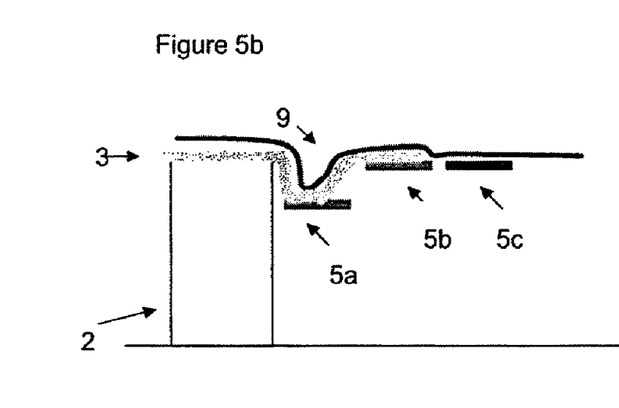
Figure 5C:
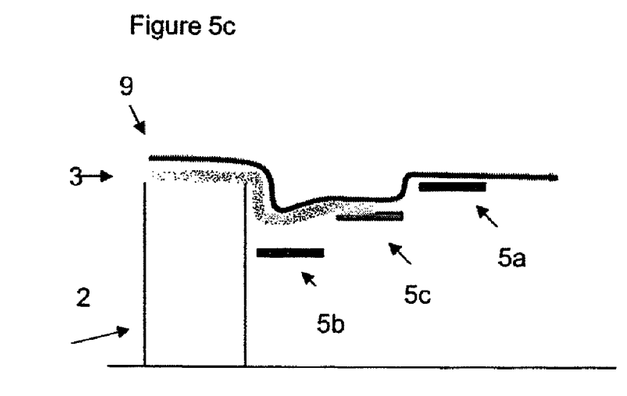
Figure 5D:
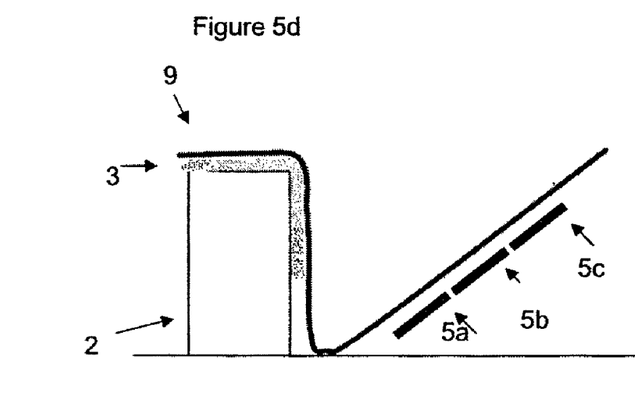

When the force from the air-tight foil 9 acting on the composite blank 3 has reached a pre-determined value, at which accurate forming of the composite blank 3 over the tool 2 is ensured, the first support means 5a is lowered, (FIG. 5b). After a time period, the second support means 5b is lowered, (FIG. 5c). After another time period the third support means 5c is lowered, (FIG. 5d). The procedure is continued until all support means 5a-n have been lowered and the composite blank 3 is formed over the tool 2. Hereby a controlled shaping of the composite blank 3 over the tool 2 is achieved where the radius of the bend of the blank 3 corresponds to the radius of the edge of the tool 2.

When the support means 5a-n have been lowered to the extent where the composite blank 3 is shaped over the tool 2 the support means 5a-n are stopped and removed, FIG. 5d. The support means 5a-n may hereby be folded towards the inclined wall 13 by pivoting of the arms 6a-n around the axis 7a-n.

Several flat elongated support means 5a-n each with a length substantially equal to the length of the tool 2 may be successively arranged parallel to each other in a direction outwards from the tool 2. The lowering of the first support means 5a, closest to the tool 2 is started when the force from the air-tight foil 9 on the blank 3 has reached a specific pre-determined value. The predetermined value is based on the characteristics of the material to be formed and the tool geometry and can be determined by the skilled person. The air-tight foil 9 forces the blank 3 downwards. The blank 3 remains supported on the first support means 5a, until a part of the blank is shaped over the tool 2, then the blank 3 relaxes due to that less pressure from the air-tight foil 9 is exerted on the blank 3, and the force acting on first support means 5a is reduced. When the force acting on support means 5a is reduced below a pre-determined value the lowering of support means 5b is started. The air-tight foil 9 forces the blank 3 downwards. The blank 3 remains supported on support means 5b, until a further part of blank 3 is shaped over the tool 2. Then, the blank 3 relaxes and the force acting on second support means 5b is reduced. When the force acting on support means 5b is reduced below a pre-determined value the lowering of support means 5c is started. The procedure is continued until all support means 5a-n are lowered and the blank 3 is formed over the tool 2.

Alternatively, several flat elongated support means 5a-n with a length which is substantially shorter than the length of the tool 2 may be arranged next to each other in a direction alongside the tool 2, thus forming a first line A comprising the members 5a, 5a', 5a". Further support means are arranged next to each other alongside the tool 2 thus forming successive lines B, C, etc in a direction outwards from the tool 2 e.g. 5b, 5b', 5b"; 5c, 5c', 5c". The lowering of one of the support means in the line A, closest to the tool 2, is started when the force from the air-tight foil 9 onto the blank 3 is higher than a pre-defined value. The predetermined value is based on the characteristics of the material to be formed and the tool geometry and can be determined by the skilled person. The air-tight foil 9 forces the blank 3 downwards. The blank 3 remains supported on the first support means 5a', until a part of the blank is shaped over the tool 2 then, the blank 3 relaxes due to that less pressure from the air-tight foil 9 is exerted on the blank, and the force acting on first support means 5a' is reduced. When the force acting on support means 5a' is reduced below a pre-determined value the lowering of one or several or the rest of the remaining support means e.g. 5a, 5a" in line A is started. The air-tight foil forces the blank 3 downwards. The blank remains supported on the support means 5a, 5a" until a part of the blank 3 is shaped over the tool 2. Then the force is reduced on the said support means and the lowering of one or several or the rest of the support means in line B is started according to the procedure describe above. The procedure is repeated until the blank 3 is shaped over the tool 2.

The force acting on the blank 2 may be measured in the support arrangements 14a-n by a sensor. A control unit controls the lowering of each of the support means 5*a-n* by actuating raising/lowering means 8*a-n* associated with each support means 5*a-n*.

Alternatively, the support means 5*a-n* may be lowered by mechanical means 8*a-n*, e.g. springs which are dimensioned to linearly compress at a specific pre-determined force acting on the support means 5*a-n*.

When the support means 5*a-n* has been lowered to the extent where the composite blank 3 is shaped over the tool 2, the support means 5*a-n* are stopped and removed. The support means 5*a-n* may be folded towards the inclined wall 19 by pivoting of the arms 6*a-n* around the axis 7*a-n*.

Finally, the shaped article is removed from the tool 2 and transported to a curing oven e.g. autoclave where the article is cured.

Figure 6A:
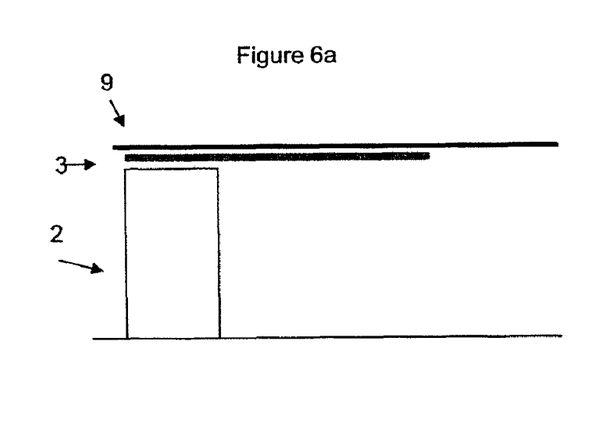
FIGS. 6a, 6b and 6c schematically illustrate the shaping of a composite blank according to the prior-art.
Figure 6B:
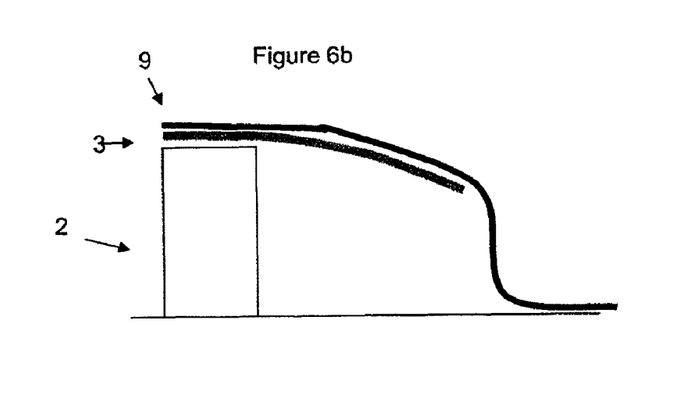
Figure 6C:
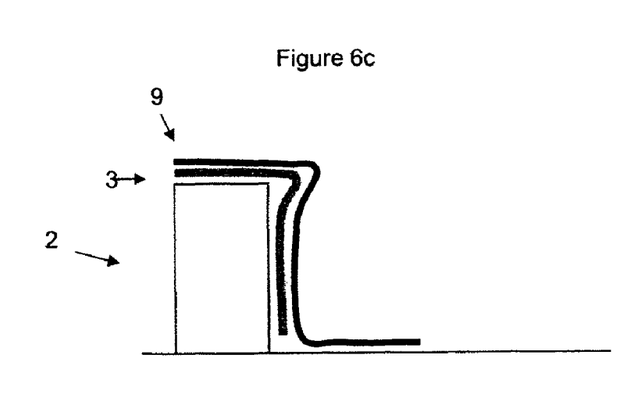

FIG. 6*a* illustrates the shaping of a composite article according to the prior art. In the first step a blank 3 of composite material is placed on the surface 2*a* of a forming tool 2 a vacuum foil 9 is applied over the arrangement. The arrangement is heated. FIG. 6*b* illustrates the forming of the blank, in which an under-pressure is created under the vacuum foil. FIG. 6*c* illustrates the blank when it is shaped over the tool. FIG. 6*c* illustrates the extra radius which is created as the blank forms over the edged of the tool 2.

Although particular embodiments have been disclosed herein in detail, this has been done for purposes of illustration only, and is not intended to be limiting with respect to the appended claims. The disclosed embodiments can also be combined. In particular, it is contemplated by the inventors that various substitutions, alterations, and modifications may be made to the invention without departing from the spirit and the scope of the invention as defined by the claims. For instance various shaping surfaces could be provided in the tool, thus making it possible to shape various types of articles e.g. C-shaped beams or hat-shaped beams. The forcing of the vacuum foil towards the blank could be performed by exerting an over-pressure on the vacuum foil for example by using an autoclave or pressure chamber. Different methods for heating the device could be used e.g. hot air, hot gases or hot fluids or electrical heating. Different means for lowering the support means could be included in the device. The support means could be arranged to pivot towards the tool, the support means could be arranged to protrude from the forming tool or from the base of the device.

The invention claimed is:

1. A device for shaping an article of composite material, the device comprising:
   a forming tool comprising a top surface and side surface for shaping at least one blank of composite material into an article having a predetermined profile;
   a air-tight foil; and
   a plurality of supports successively arranged in a direction extending outwards from the tool and/or arranged alongside the tool, wherein the supports are at least one support arranged to be in supporting contact with an underside of a protruding part of the blank, wherein the supports are not connected to the tool, and wherein the supports are arranged to be lowered in a predetermined order.

2. The device according to claim 1, wherein each support comprises a raising/lowering portion.

3. The device according to claim 2, wherein each support is arranged on an arm, thus forming a support arrangement.

* * * * *

UNITED STATES PATENT AND TRADEMARK OFFICE
CERTIFICATE OF CORRECTION

Page 1 of 1

PATENT NO.      : 8,282,375 B2
APPLICATION NO. : 13/220514
DATED           : October 9, 2012
INVENTOR(S)     : Petersson et al.

It is certified that error appears in the above-identified patent and that said Letters Patent is hereby corrected as shown below:

In the Claims

Column 8 Line 14-27 Claim 1 should read:

1. A device for shaping an article of composite material, the device comprising:
a forming tool comprising a top surface and side surface for shaping at least one blank of composite material into an article having a predetermined profile;
a air-tight foil; and
a plurality of supports successively arranged in a direction extending outwards from the tool and/or arranged alongside the tool, wherein the supports are ~~at least one support~~ arranged to be in supporting contact with an underside of a protruding part of the blank, wherein the supports are not connected to the tool, and wherein the supports are arranged to be lowered in a predetermined order.

Signed and Sealed this
Twenty-third Day of September, 2014

Michelle K. Lee
*Deputy Director of the United States Patent and Trademark Office*